(12) United States Patent
Heim et al.

(10) Patent No.: US 7,170,043 B2
(45) Date of Patent: Jan. 30, 2007

(54) METHOD AND SENSOR FOR DETERMINING THE LOCAL CONTRAST OF AN OBSERVED SCENE BY DETECTION OF THE LUMINANCE FROM SAID SCENE

(75) Inventors: Pascal Heim, Bevaix (CH); Pierre-François Ruedi, Hauterive (CH); Eric Fragniere, Neuchatel (CH); Eric Grenet, Neuchatel (CH); François Kaess, Eclepens (CH)

(73) Assignee: CSEM Centre Suisse d'Electronique et de Microtechnique SA - Recherche et Developpement, Neuchatel (CH)

( * ) Notice: Subject to any disclaimer, the term of this patent is extended or adjusted under 35 U.S.C. 154(b) by 3 days.

(21) Appl. No.: 10/526,358

(22) PCT Filed: Sep. 1, 2003

(86) PCT No.: PCT/EP03/09740

§ 371 (c)(1),
(2), (4) Date: Mar. 2, 2005

(87) PCT Pub. No.: WO2004/023791

PCT Pub. Date: Mar. 18, 2004

(65) Prior Publication Data

US 2006/0011806 A1      Jan. 19, 2006

(30) Foreign Application Priority Data

Sep. 3, 2002   (FR)   .................................... 02 10897

(51) Int. Cl.
*H01J 40/14*      (2006.01)
*G01J 1/42*       (2006.01)

(52) U.S. Cl. ............................... 250/214 R; 250/208.2

(58) Field of Classification Search ............. 250/208.1, 250/214 R, 214 A, 214 LA, 208.2; 257/291, 257/292
See application file for complete search history.

(56) References Cited

U.S. PATENT DOCUMENTS 4,797,562 A    1/1989   Dietrich
(Continued)

FOREIGN PATENT DOCUMENTS

EP      1 150 250 A1    10/2001
(Continued)

OTHER PUBLICATIONS

Ni Y., et al., "Histogramme-Equalization Based Adaptive Image Sensor for Real-Time Vision", IEEE Journal of Solid-State Circuits vol. 32, Jul. 1997 (Abstract Only).
(Continued)

Primary Examiner—Stephone B. Allen
(74) Attorney, Agent, or Firm—Jacobson Holman PLLC

(57) ABSTRACT

The invention relates to a method of calculating the local contrast at each pixel ($P_C$) in a network ($M_p$) of photosensitive pixels which are arranged in at least one dimension (x, y). The inventive method consists in, during successive image acquisition cycles, producing a signal which is representative of the local luminance at each pixel, said luminance-representative signals being integrated values of luminance values sensed by the respective pixels ($p_C$, $p_G$, $p_D$, $p_H$, $p_B$). The inventive method consists in: sampling the integrated values of the signals representing the luminance values at the pixels adjacent ($p_G$, $p_D$, $p_H$, $p_B$) to a considered pixel ($p_C$), said sampling taking place at an instant in the cycle when the integrated value of the luminance at the considered pixel ($p_C$) is equal to a pre-determined reference value; and determining the local contrast at the considered pixel ($p_C$) on the basis of values thus sampled.

22 Claims, 8 Drawing Sheets

U.S. PATENT DOCUMENTS 5,038,026 A * 8/1991 Krause ................ 250/208.1
5,837,993 A    11/1998 Philippe et al.
6,069,377 A     5/2000 Prentice et al.

FOREIGN PATENT DOCUMENTS

| FR | 2 605 475 A1 | 4/1988 |
|----|--------------|--------|
| WO | WO 98/14002  | 4/1998 |
| WO | WO 01/99292 A2 | 12/2001 |

OTHER PUBLICATIONS

Kavidias, S., et al., "A Logarithmic Response CMOS Image Sensor with On-Chip Calibration", IEEE Journal of Solid-State Circuits vol. 35, Aug. 2002.

* cited by examiner

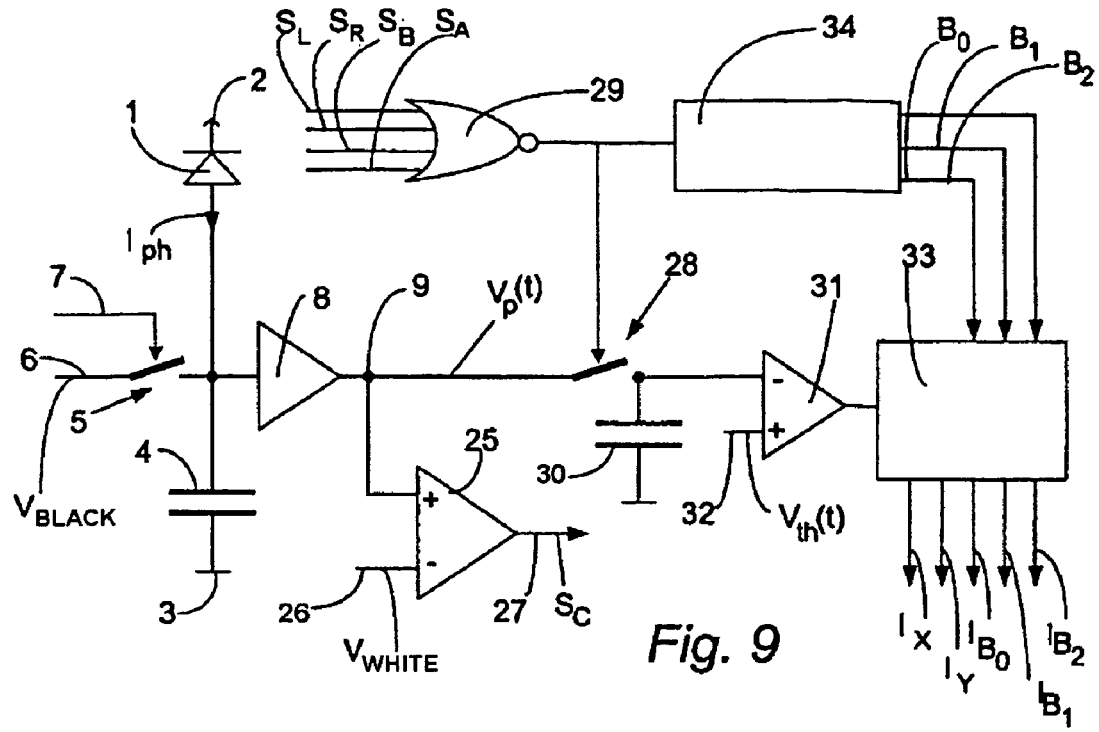
Fig. 9
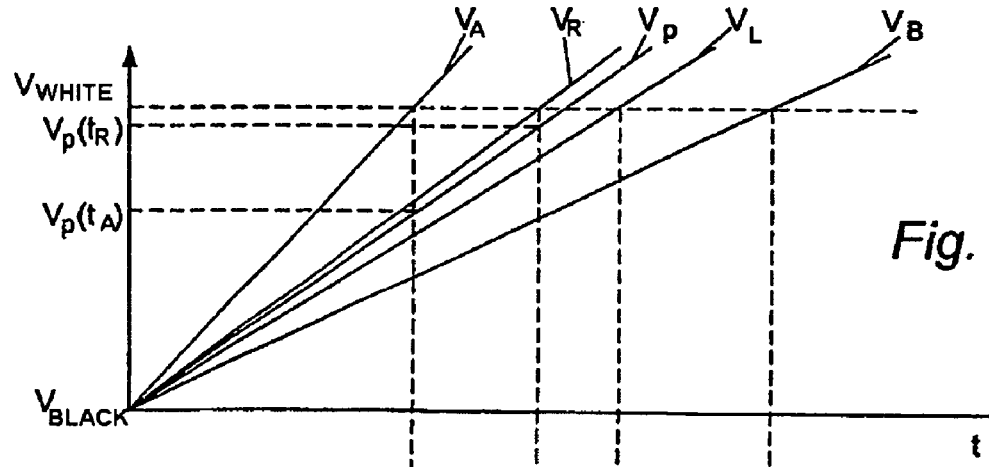
Fig. 10
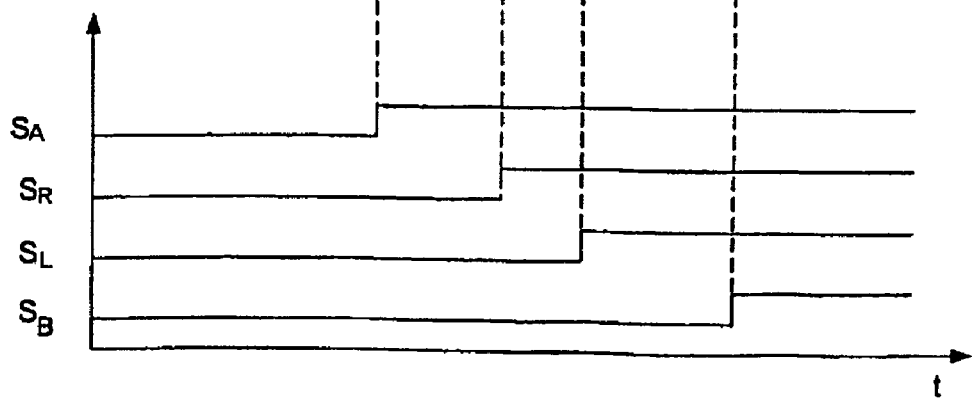

METHOD AND SENSOR FOR DETERMINING THE LOCAL CONTRAST OF AN OBSERVED SCENE BY DETECTION OF THE LUMINANCE FROM SAID SCENE

This is a nationalization of PCT/EP03/009740 filed Sep. 1, 2003 and published in French.

BACKGROUND OF THE INVENTION

1. Field of the Invention

The present invention relates to a method and a sensor for determining the local contrast of an observed scene by detecting the luminance of said scene using an array of CMOS photosensors.

2. Description of the Related Art

In the optical imaging art, it is known to acquire the image of an observed scene using an array of photosensors each of which is associated with an analysis circuit forming with it what is usually referred to as a pixel. The array of pixels is preferably implemented in the form of a CMOS integrated circuit.

The photosensors of each pixel deliver a current proportional to the quantity of light that they receive from the observed scene. In practice, the average brightness of a real image may vary as a function of situation by six orders of magnitude. Consequently, the currents delivered by the photosensors may vary in the same proportions. It is therefore necessary to use adaptation circuits to adapt the currents to the levels required by the processing circuits of each pixel, which is to the detriment of the input dynamic of the system, which in practice rarely exceeds two to three orders of magnitude.

Several techniques for increasing the input dynamic are known in the art. One of them, described in a paper by S. Kavidias et al. in IEEE, Journal of Solid State Circuits, vol. 35, August 2000 entitled "A Logarithmic Response CMOS Image Sensor with On-Chip Calibration", consists in applying logarithmic compression to the current delivered by the photosensor, using low-inversion MOS transistors. The problem with this technique is that it requires matched transistors to effect logarithmic compression within the matrix of pixels. This is a considerable implementation constraint if anything like satisfactory accuracy is required.

Another technique, described for example in FR 2 605 475, in WO 98/14002 and in a paper by Y. Ni et al. in IEEE, Journal of Solid State Circuits, vol. 32, July 1997 entitled "Histogramme-Equalization-Based Adaptive Image Sensor for Real-Time Vision", consists in integrating the current delivered by the photosensor in a capacitor until a defined reference voltage is obtained across the capacitor. Each pixel of the array of pixels signals the time at which the voltage across its integrator capacitor reaches the reference value. In this case, the input dynamic is limited by the maximum integration time allowed to the system and by its intrinsic noise. This technique may be associated with methods of classifying samples using histograms. This technique is also complex and leaves something to be desired with regard to accuracy.

To overcome the problems caused by the considerable variation in brightness, it is also known in the art to determine the local contrast of an image captured by an array of pixels. This method is of interest because, for a given element of the observed scene, the contrast has the same value whether that element is in the shade or in bright sunlight. Now, as the local contrast provides a reliable representation of the activity of each pixel, determining it eliminates the problems inherent to the prior art techniques described in the prior art documents cited above.

SUMMARY OF THE INVENTION

For a discrete unidimensional system, for example a row of pixels, the local contrast may be defined by the following expression:

$$C = 2 \cdot \frac{L_L - L_R}{L_L + L_R} \quad (1)$$

in which C is the local contrast associated with a pixel and $L_L$ and $L_R$ are signals representing luminances captured by pixels to the left and to the right, respectively, of the pixel concerned. In other words, the local contrast corresponds to the local luminance gradient normalized by their average. This contrast is therefore independent of the local luminance.

The equation (1) may be applied to a captured image of a scene having a strongly illuminated area Z1 and a weakly illuminated area Z2, the reflectances of the objects present in the scene being assumed to be identical for the purposes of explanation, and the ratio of illumination of the two areas being assumed to be 5:1. This situation is illustrated by the diagram in FIG. 1 of the appended drawings, in which the relative luminance Ir is plotted as a function of the location of pixels p1 to p21 in a row of pixels forming a portion of a unidimensional array of pixels used for experimental purposes.

Now, despite this considerable illumination difference, it is found that the contrast values calculated on the basis of equation (1) are the same for points corresponding to the two areas (pixels p1 and p11, pixels p2 and p12, pixels p3 and p13, etc.).

The definition of contrast may be extended to a bidimensional matrix of pixels $M_p$ by distinguishing two contrast components $C_x$ and $C_y$ along the x and y axes of the matrix. In this case (see FIG. 2 of the appended drawings, which represents a portion of a matrix $M_p$ of this kind), this means the respective luminances $L_L$, $L_R$, $L_A$ and $L_B$ of certain pixels $P_L$ (left), $P_R$ (right), $P_A$ (above) and $P_B$ (below) adjacent a central pixel $P_C$ at any location in the matrix $M_p$ (the qualifiers left, right, above and below used here have merely an explanatory meaning, the positions of the pixels in space being arbitrary).

The two components may then be written:

$$C_x = 4 \cdot \frac{L_L - L_R}{L_L + L_R + L_A + L_B} \quad (2)$$

$$C_y = 4 \cdot \frac{L_A - L_B}{L_L + L_R + L_A + L_B}$$

In these equations also, the local contrast corresponds to the gradient of the local luminances normalized by their average.

To calculate the contrast for a given pixel in the case of the bidimensional matrix $M_p$, it is therefore necessary to calculate the sum of four signals representative of the luminance and to divide the difference of two signals representative of the luminance by the result of that summing operation. Complex circuits are required to effect these arithmetical operations directly in the analog domain with the required accuracy. Now, in a matrix of pixels of the kind concerned, most functions must be implemented within each individual pixel, the latter comprising the photosensor and the photocurrent integration circuit as well as the circuits for calculating the contrast associated therewith. The analog circuits needed to calculate the equations (2) above are not compatible with present day requirements for the miniaturization of matrices of pixels of the kind concerned, primarily because they are too large.

Clearly the above equations for calculating the contrast are merely indicative and may be varied without departing from the scope of the invention. The number and the position of the adjacent pixels used in the calculation are also subject to variation. In its most widely accepted sense, the term "contrast" is defined as the relative difference between the luminances of adjacent points. Moreover, and although the term "contrast" will continue to be used in the remainder of the description, it is to be understood that the invention is aimed at any calculation circuit that uses signals supplied by adjacent pixels and whose result is normalized relative to a local luminance value.

A first object of the invention is to provide a method of determining the local contrast at the level of each pixel using a circuit which, because of its low complexity, may be incorporated into the pixel without degrading the accuracy needed for determining the local contrast and without violating imposed miniaturization requirements.

The invention therefore consists in a method of determining the local contrast at the level of each pixel of an array of photosensitive pixels disposed in at least one dimension, in which method, during respective successive image capture cycles, a signal is generated that is representative of the local luminance captured by each pixel, the luminance signals being integrated values of the luminance values captured by respective pixels, which method is characterized in that it consists in sampling the integrated values of the signals representing the luminances captured by the pixels adjacent a pixel concerned at a time in said cycle at which the integrated value of the luminance captured by said pixel concerned becomes equal to a predetermined reference value, and determining the local contrast of said pixel concerned on the basis of the values sampled in this way.

Thanks to the above features, the means needed to obtain the value and orientation of the local contrast may be simple, a supplemental advantage of the invention being that the values obtained become independent of the level of illumination of the observed scene.

In a first embodiment of the method of the invention, said reference value is chosen as an intermediate value of the difference between a maximum white level value and a maximum black level value liable to be captured by said pixels, said intermediate value preferably being equal to half this difference.

This feature makes it possible to obtain the required values with very great accuracy, subject to a simple calculation.

It is then possible to calculate the local contrast by applying to said at least one dimension of said array the following expression:

$$C_{pn} = \frac{L_{p(n-1)} - L_{p(n+1)}}{L_{pn}}$$

in which $C_{pn}$ is the local contrast calculated for said cycle of a pixel of rank n in the row of the array oriented along said dimension, $L_{pn}$ is a signal representing the luminance captured by the pixel of rank n, $L_{p(n-1)}$ is a signal representing the luminance captured by the preceding adjacent pixel in said row of rank n−1, and $L_{p(n+1)}$ is a signal representing the luminance captured by the next adjacent pixel in said row of rank n+1.

Accordingly, in this first embodiment, the invention is also based on the observation that the value of the local contrast at the level of each pixel may be obtained by an approximate calculation of that value, the accuracy being entirely satisfactory in most practical situations, by making the assumption, which is also verified in most practical situations, that, for a given dimension of the array, the luminances captured each time by three pixels involved in the calculation are situated in the same plane in space. The error in the value of the local contrast obtained in this way is in fact negligible since in a real image the low-pass filtering applied by the sensor to the observed image, whether optical or electronic, diffuses the contours, to the extent that the brightness impinging on the central pixel of the three pixels concerned is very close to the assumed theoretical value, through the simplification of the approximate calculation in accordance with the invention. The denominator of the expression defining the local contrast then contains only one value, namely that of the signal representing the luminance of the pixel $p_n$ at which the contrast is to be determined.

According to another interesting feature of this embodiment, the signals representative of the luminance are integrated values of the luminance values captured by the respective pixels and the method further consists in sampling the integrated values of the signals representing the luminances captured by said adjacent (preceding and following) pixels at a time in said cycle at which the integrated value of the luminance captured by the pixel concerned becomes equal to a predetermined reference value, and calculating the local contrast of the pixel concerned on the basis of the values sampled in this way.

This feature has the important advantage that, for calculating the contrast, it is possible to dispense with the signal representing the luminance captured by the central pixel, without degrading the accuracy with which the contrast is determined. Because of this, calculating the contrast amounts to executing simple subtraction operations and no longer involves any division operation. The calculation circuit may then be very simple.

According to another feature of this first embodiment, the integrated values of the signals representing the luminances captured by said adjacent pixels are accumulated in respective capacitors at the time at which the integrated value of the pixel concerned reaches said reference value, said capacitors providing the values necessary for the calculation of the contrast.

The input needed by the contrast calculation circuit during each image capture cycle is therefore obtained in a particularly simple manner.

If said array takes the form of a matrix of pixels with two dimensions, the contrast calculation is effected on the basis of the following equations:

$$C_x = L_L - L_R$$

and $$C_y = L_A - L_B$$

in which:
- $C_x$ is the local contrast component in the x direction of the matrix,
- $C_y$ is the local contrast component in the y direction of the matrix,
- $L_L$, $L_R$ are signals representative of the luminances captured by the respective pixels adjacent the pixel concerned in the x direction,
- $L_A$, $L_B$ are signals representative of the luminances captured by the respective pixels adjacent the pixel concerned in the y direction, said expressions being used to calculate the components of the contrast vector at the level of said pixel concerned.

It further proves to be advantageous if each pair of accumulated values belonging to said x and y directions, respectively, is subjected to four-quadrant analog multiplication by a cosinusoidal signal and a sinusoidal signal of the same frequency and amplitude as said cosinusoidal signal, respectively, and in that the results of the corresponding multiplications are added to form the modulus and the phase of the local contrast vector corresponding to said pixel concerned.

This feature makes it possible to obtain the required result subject to a particularly simple implementation in each pixel of the array.

In a second embodiment of the invention, said reference value is chosen to be a maximum white level value liable to be captured by said pixels.

Although this embodiment provides only the maximum component of the contrast (cX, cY) and an orientation of the discretized contrast in octants, it proves that this kind of result may suffice in certain applications, the advantage of this being that the local contrast may be determined by logical processing of binary signals no longer necessitating any calculation operation. The necessary circuits in each pixel may then be even further simplified.

In the second embodiment of the invention, the method advantageously consists, during each of said image capture cycles, in measuring the times at which, in a group of pixels made up of the pixel concerned and its adjacent pixels, the integrated values of the luminance values captured by those pixels reach said white level value and taking as the value of the local contrast the integrated value for the pixel concerned when the first of the adjacent pixels reaches said white level value. The order in which said integrated values reach the white level value then determines the orientation of the local contrast.

The invention also provides a sensor for determining the local contrast capable of executing either of the embodiments of the method of the invention defined hereinabove.

BRIEF DESCRIPTION OF THE DRAWINGS

Other features and advantages of the present invention will become apparent in the course of the following description which is given by way of example only and with reference to the appended drawings, in which:

FIG. 9 is a diagram of another embodiment of the invention;

FIG. 10 is a timing diagram showing the operation of the FIG. 9 embodiment of the invention;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 3:
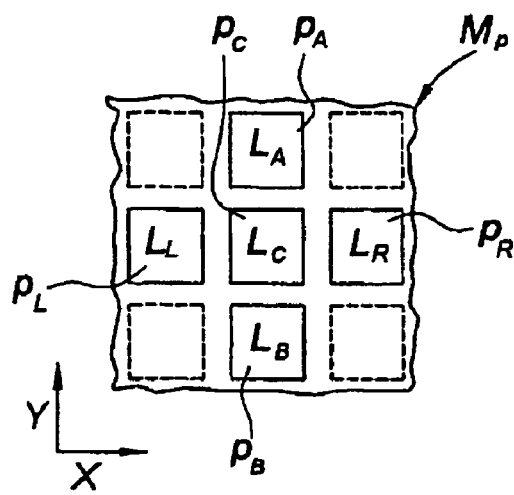
FIG. 3 is a view analogous to that of FIG. 2 and is used to explain the basic concepts of the present invention.
Figure 4:
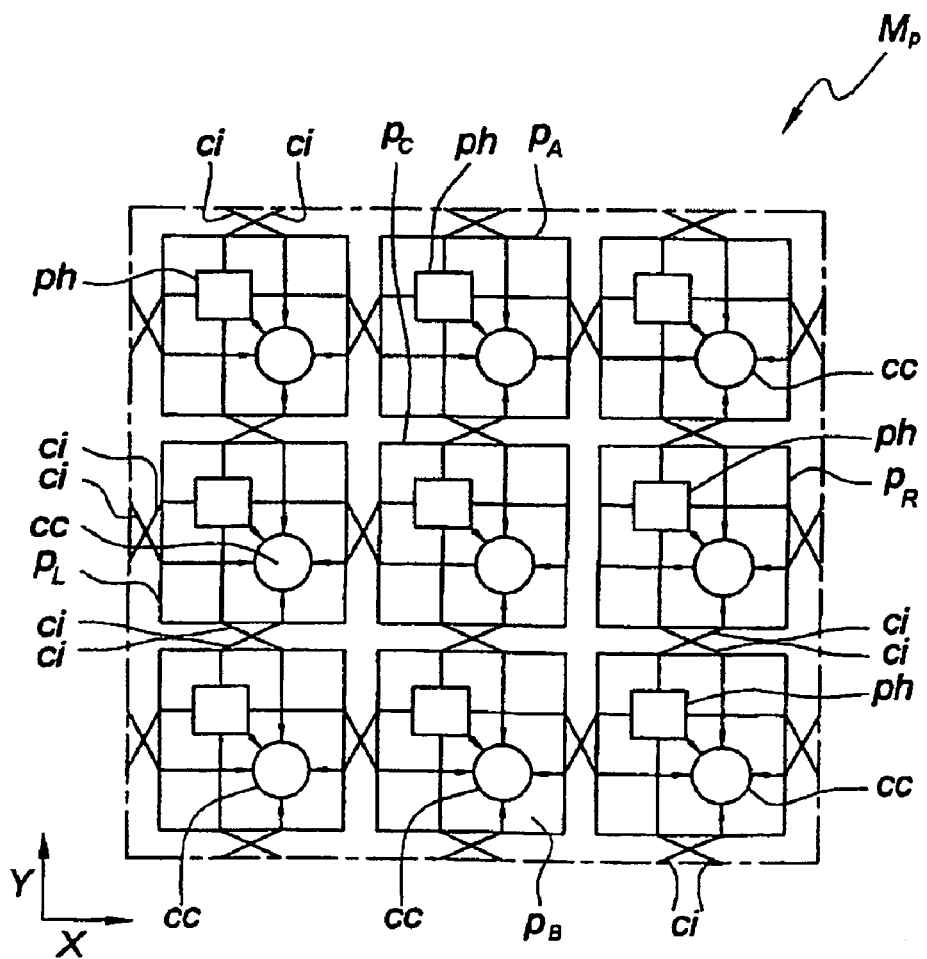
FIG. 4 is a more detailed view of the part of the bidimensional matrix shown in FIG. 3.

FIGS. 3 and 4 show the basic concept of a first embodiment of the invention applied to a matrix $M_p$ of pixels forming a two-dimensional array, it being understood that this concept may be used for unidimensional arrays formed by rows of pixels.

Figure 2:
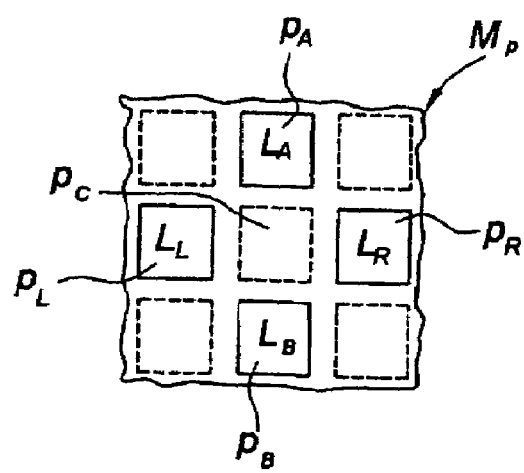
FIG. 2, also already described, shows part of an array in the form of a bidirectional matrix of pixels to illustrate the prior art method of calculating the local contrast.

This being so, FIG. 3 shows again the portion of the matrix $M_p$ of pixels already described with reference to FIG. 2, but here the central pixel $p_C$ is labelled with the luminance $L_C$ that it may capture. According to the invention, the local contrast at the level of the central pixel $P_C$ is calculated from the following equations:

$$C_x = \frac{L_L - L_R}{L_C} \quad (3)$$

$$C_y = \frac{L_A - L_B}{L_C}$$

In the above equations:
- $C_x$ is the local contrast component in the x direction of the matrix,
- $C_y$ is the local contrast component in the y direction of the matrix, $L_C$ is the signal representative of the luminance captured by the central pixel $p_C$, $L_L$, $L_R$ are signals representative of the luminances captured by the pixels adjacent the central pixel $p_C$ in the x direction, $L_A$, $L_B$ are signals representative of the luminances captured by the pixels adjacent the central pixel $p_C$ in the y direction.

To perform the calculation using the above equations, during each image capture cycle, the method of the invention communicates to each pixel of the matrix the signals representative of the luminances captured by the four adjacent pixels along the x and y axes. This is shown in FIG. 4, which is a representation to a larger scale and in greater detail of the matrix portion represented in FIG. 3.

Each pixel comprises a photosensor circuit ph generating a signal representing the luminance and a local contrast calculation circuit cc connected to the photosensor circuits ph of the four adjacent pixels along the x and y axes of the matrix by interpixel connections ci. Each calculation circuit cc can therefore receive the four signals representative of the luminance coming from its neighbors $p_L$, $p_R$, $p_A$ and $p_B$ and is adapted to perform the arithmetical operations specified in the above equations (3). Those operations being simple subtractions or divisions, the person skilled in the art will know how to design a calculation circuit for executing them with no further information. The details of the calculation circuits are therefore not described here.

Clearly FIGS. 3 and 4 represent only a very small number of the pixels of the matrix $M_p$, which may comprise a large number of pixels, as is well known in the art; for example, a matrix of 64×64 pixels may be envisaged. As is also known in the art, each pixel has its own addressing means and payload signal transmission means based on the temporal coding method described in EP 1 150 250 in the name of the patentee of the present patent application, for example.

In the embodiment of the invention that has just been described, the calculation circuits cc must perform two subtractions and two divisions, which simplifies the calculations compared to those that had to be performed in the prior art.

Nevertheless, according to an advantageous improvement of the invention, the calculation of the local contrast components may be even further simplified and in fact reduced to two simple subtractions. An embodiment using this improvement is described next with reference to FIG. 5.

That figure represents a more detailed circuit of each pixel p of the matrix $M_p$. The photosensor circuit ph of the pixel p comprises a photodiode 1 or an appropriate equivalent photosensitive element that is disposed in series between the power supply terminals 2 and 3 with an integration capacitor 4. The node between the capacitor 4 and the photodiode 1 is connected to a semiconductor switch 5 for applying to it the signal coming from a black level terminal 6 under the control of a signal at a control terminal 7. The node in question is also connected to a follower amplifier 8 of unity gain, for example, whose output is connected to the terminal 9.

The luminance signal $V_p(t)$ is formed in the following manner.

Before exposure, the switch 5 connects the capacitor 4 to a black level voltage that is applied to the terminal 6 so that the capacitor 4 is charged to that voltage level, which represents the black level. Exposure begins with the opening of the switch 5. The photocurrent $i_{ph}$ proportional to the luminous intensity impinging on the diode 2 is integrated in the capacitor 4. The luminance signal $V_p(t)$ may then be sampled at the terminal 9.

The terminal 9 is also connected to a first input of a comparator 10 whose other input receives a reference voltage $V_{ref}$ that is applied to a terminal 11 of the pixel. When the voltage $V_p(t)$ reaches the value $V_{ref}$, the output of the comparator 10 operates four semiconductor switches $12_R$, $12_L$, $12_A$ and $12_B$ to which are applied respective luminance voltages $V_R(t)$, $V_L(t)$, $V_A(t)$ and $V_B(t)$ coming from adjacent pixels via the connections ci (see FIG. 4) and applied to corresponding terminals $13_R$, $13_L$, $13_A$ and $13_B$. These voltages are sampled by means of respective sampling capacitors $14_R$, $14_L$, $14_A$ and $14_B$ so that they can be used at the appropriate time by a circuit 15 for calculating contrast values in which the required contrast value is preferably calculated in the form of the local contrast vector of the pixel p concerned. The corresponding data appears at a terminal 16 of the latter.

Figure 5:
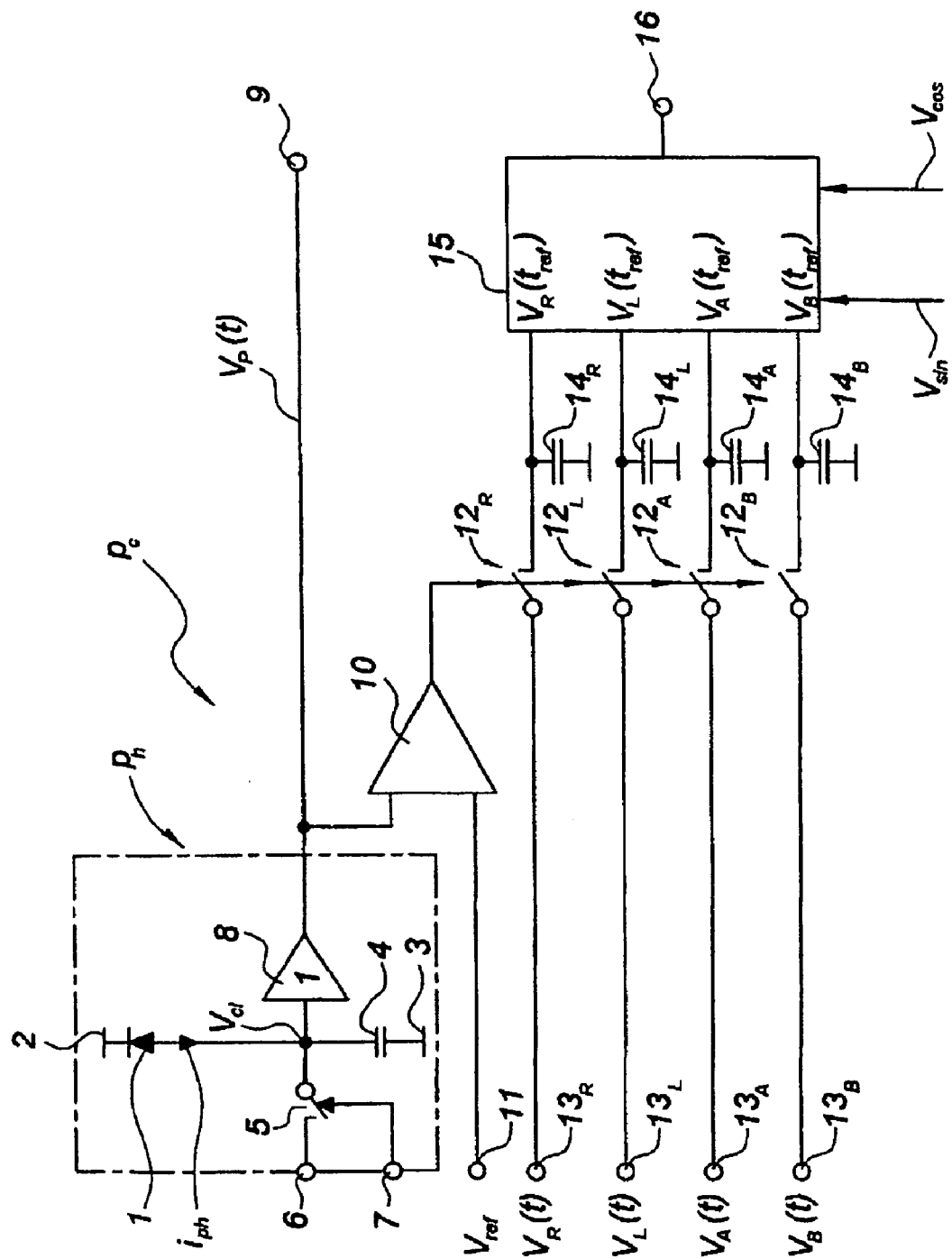
FIG. 5 is a simplified diagram of a pixel forming part of the FIG. 4 bidimensional matrix.

Note that the luminance signal $V_p(t)$ may be obtained from means other than those described hereinabove with reference to the photodetector circuit Ph of FIG. 5 provided that the output magnitude of the circuit is proportional both to the observed luminance and to the integration time. Similarly, the photosensitive element 1 may be any other component known in the art, for example a phototransistor.

To explain the operation of the other components represented in FIG. 5, it will be assumed that the global luminance of the observed image is constant during the integration time provided. In this case, the voltage at the terminals of the integration capacitor 4 of each pixel increases linearly as a function of time, with a slope proportional to the current of its associated diode 1, and therefore to the local luminance corresponding to the pixel concerned. It is therefore possible to write:

$$V_{ci}(t) = K \cdot L_p \cdot t \qquad (4)$$

where $V_{ci}$ is the voltage across the capacitor 4, $L_p$ is the local luminance, and K is a constant of proportionality depending on certain parameters such as, for example, the quantum efficiency of the technology used and the value of the integration capacitor 4. The voltage $V_{ci}$ across the capacitor 4 is equivalent to the voltage $V_p(t)$ at the output of the unity gain follower amplifier 8.

During integration, the latter voltage $V_p(t)$ is compared continuously to the reference voltage $V_{ref}$ applied to the terminal 11 of the pixel p. At the time $t_{ref}$ that it becomes equal to the reference voltage $V_{ref}$, the output of the comparator 10 changes state and opens the semiconductor switches $12_R$, $12_L$, $12_A$ and $12_B$. The respective voltages representing the instantaneous luminances of the adjacent pixels, integrated in the respective capacitors 4 thereof, are then sampled at the corresponding capacitors $14_R$, $14_L$, $14_A$ and $14_B$, these voltages being respectively designated $V_R(t_{ref})$, $V_L(t_{ref})$, $V_A(t_{ref})$ and $V_B(t_{ref})$ and applied to the contrast calculation circuit 15. Note that this sampling is independent of the integration process taking place in the cells by means of the capacitors 4, that process continuing in each of the cells for as long as the inherent saturation voltage of the circuits is not reached, it being understood that the circuits must be dimensioned so that the saturation voltage is higher than the white level.

Figure 1:
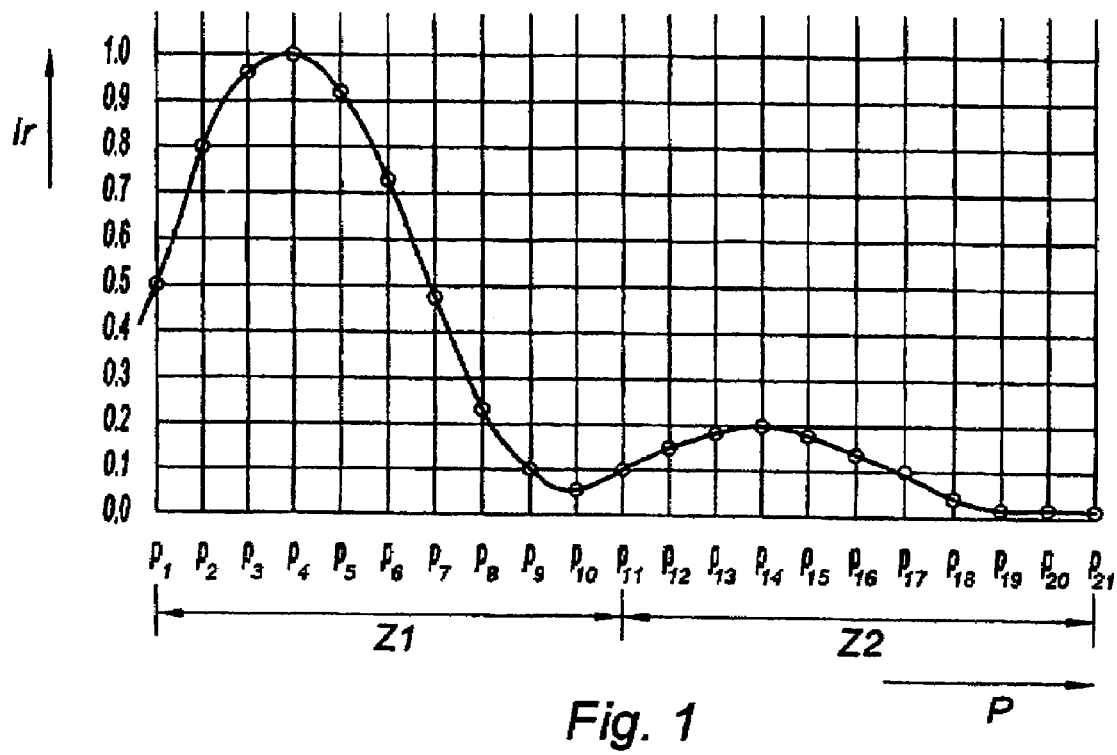
FIG. 1, already described, is a diagram of the evolution of the luminance captured by a linear array of pixels as a function of their location in the array, the diagram showing an interesting property of the local contrast in this kind of linear array of pixels.
Figure 6:
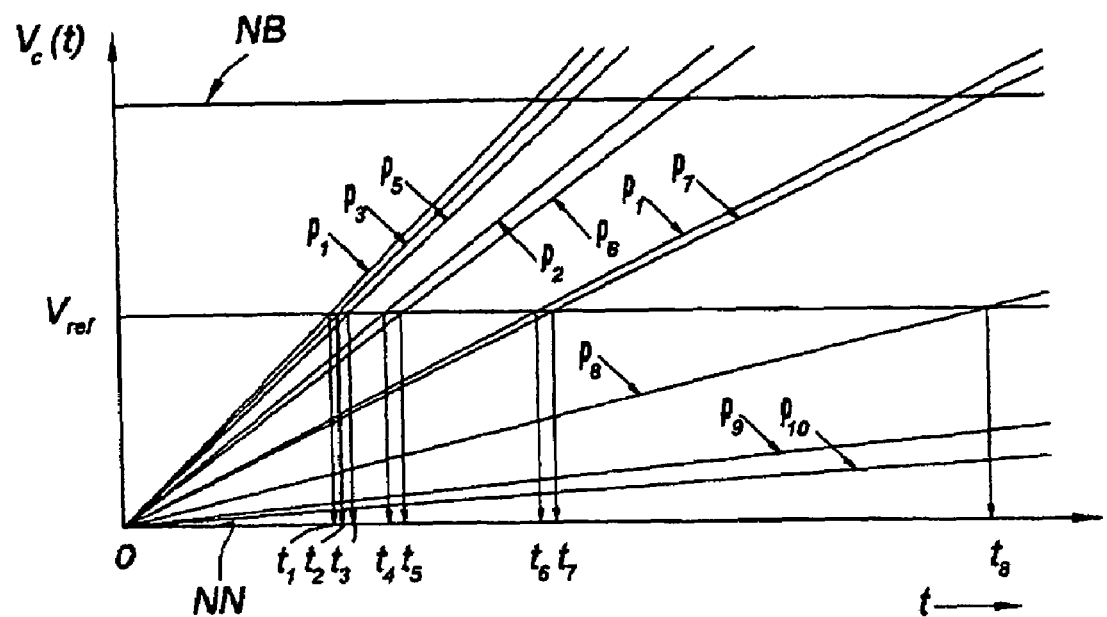
FIGS. 6 and 7 are diagrams showing the operation of the matrix represented in FIG. 4.
Figure 7:
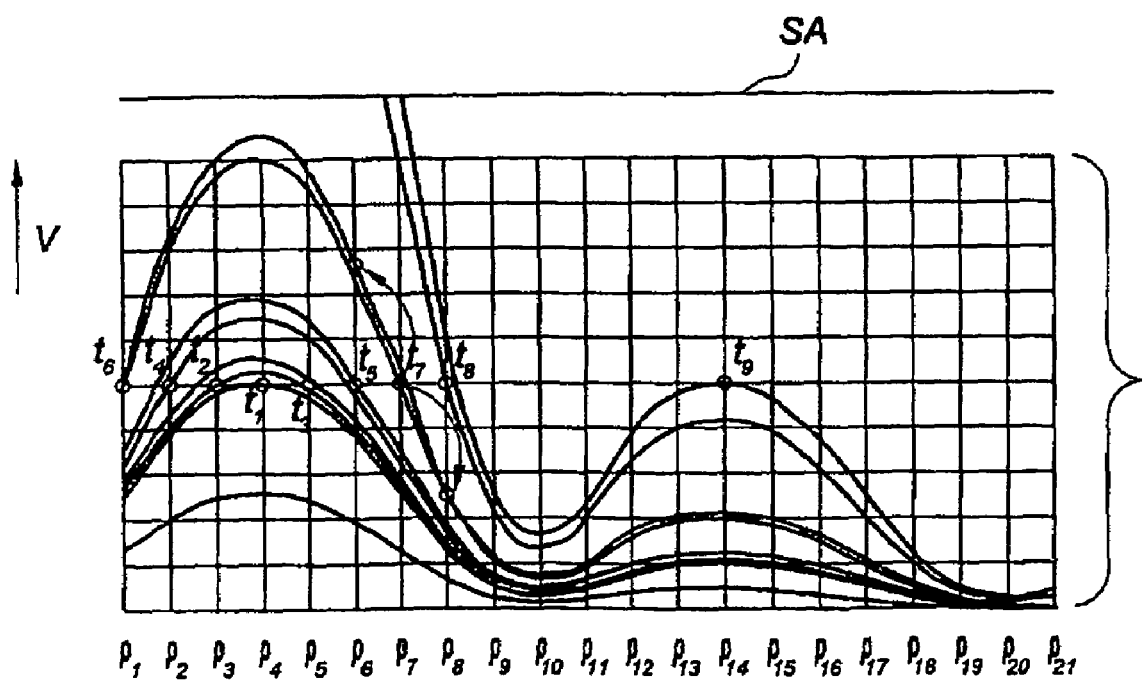

FIGS. 6 and 7 illustrate the operation just described. FIG. 6 represents the trend of the integrated voltages (here collectively designated $V_c(t)$ on the ordinate axis) of a certain number of pixels p1 to p10 arranged on a row of the matrix of the array, assuming illumination of the latter analogous to that represented in FIG. 1. If the captured image is static during integration (as is assumed to be the case here), the integrated voltages $V_c(t)$ of the pixels evolve in a linear manner with time. However, in practice the integration voltages evolve only between two levels, a black level NN and a white level NB, which define an integration range assuring correct operation before the inherent saturation of the circuits is reached (see in FIG. 7 the straight line segment SA that represents the saturation level), the reference voltage $V_{ref}$ being selected at around half the difference between the levels NN and NB.

FIG. 7 represents the spatial profile of the integration voltages of the pixels $p_1$ to $p_9$ at different times during integration in the capacitors 4 of those pixels. The curves represented are taken at the respective times $t_1$, $t_2$, $t_3$, etc. (FIG. 6) that correspond to the profile of the voltages at the respective times that they reach the reference voltage $V_{ref}$. Note that in FIGS. 6 and 7, to make the diagrams clear, not all of the pixels are represented. By way of example, there is shown the measurement of contrast at the time $t_7$, the contrast value resulting in this case from the difference between the measured amplitudes in the pixels $p_6$ and $p_8$.

As a result, for any pixel of the matrix, the integration voltages necessary for calculating the local contrast are sampled when the voltage of that pixel coming from the amplifier 8 is equal to a value that is identical for the whole of the matrix. Consequently, normalizing these integration voltages amounts to dividing by a constant. Ignoring this constant (which corresponds to a gain from the electronic point of view), the sampled voltages of the pixels adjacent the pixel concerned are implicitly normalized by the voltage of the latter.

Under these conditions, the voltage differences:

$$V_{p_{cx}}(t_{ref}) = V_D(t_{ref}) - V_G(t_{ref})$$

$$V_{p_{cy}}(t_{ref}) = V_H(t_{ref}) - V_B(t_{ref}) \tag{5}$$

respectively represent, apart from the same multiplication constant, the x and y components of the contrast vector of the pixel concerned:

$$V_{p_{cx}}(t_{ref}) = k \cdot p_{cx}$$

$$V_{p_{cy}}(t_{ref}) = k \cdot P_{cy} \tag{6}$$

The voltages constitute the required result and may be processed in a manner that is known to the person skilled in the art. For example, they may be converted from analog form to digital and then processed in a digital signal processor (DSP). It may also be beneficial to preprocess the contrast vector at the level of the sensor itself to restrict the data obtained to the most pertinent information. For example, the temporal coding method described in EP 1 150 250 may be applied.

Four-quadrant multiplier means 17 (see FIG. 8) that form part of the calculation circuit 15 represented in FIG. 5 are used to calculate the contrast vectors.

Figure 8:
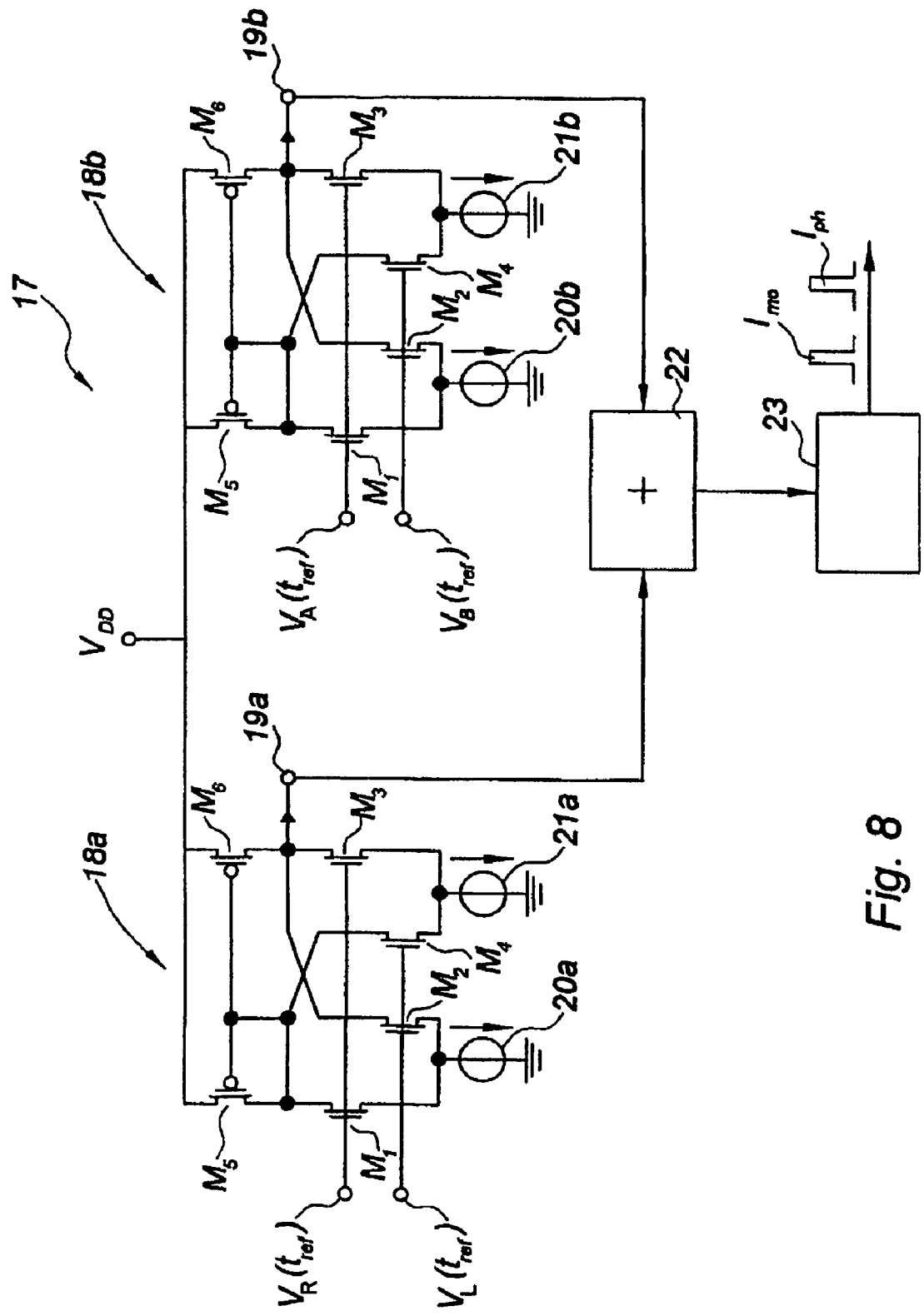
FIG. 8 is a diagram of a circuit for calculating the contrast vector used in the pixel represented in FIG. 5.

The multiplier means 17 comprise two analog multipliers 18a and 18b of identical structure respectively assigned to calculations for the x and y directions in relation to any pixel $p_C$ of the array of pixels. Each multiplier employs a function of the form:

$$I_{out} = \beta \cdot (V_1 - V_2) \cdot (V_4 - V_3) \tag{7}$$

in which:

$I_{out}$ is the output current of the multiplier 18a or 18b appearing at a respective output 19a, 19b thereof, $V_1$ and $V_2$ are the voltages sampled as described with reference to FIG. 5, that is to say for the x direction in relation to a pixel $p_C$, the voltages $V_R(t_{ref})$ and $V_L(t_{ref})$, respectively, and for the y direction in relation to the same pixel, the voltages $V_A(t_{ref})$ and $V_B(t_{ref})$, respectively, and $V_3$ and $V_4$ are respective sinusoidal voltages $V_a \cdot \cos \phi(t)$ and $V_b \cdot \sin \phi(t)$ generated by sinusoidal voltage generators 20a, 21a and 20b, 21b, respectively, as shown in FIG. 8. Of course, the sinusoidal voltages may easily be generated by a single generator (not shown) whose diagram will be evident to the person skilled in the art.

Applying equation (7) for the multiplier 18a and using the corresponding equation (5), the resultant current $I_x$ for the x axis becomes:

$$I_x = \beta V_A \cdot V_{P_{cx}}(t_{ref}) \cdot \cos \phi(t) \tag{8}$$

and similarly, for the multiplier 18b, the current $I_y$ for the y axis becomes:

$$I_y = \beta V_A \cdot V_{P_{cx}}(t_{ref}) \cdot \sin \phi(t) \tag{9}$$

The outputs 19a and 19b of the multipliers 18a and 18b are connected to the inputs of an adder 22 which calculates the difference $I_{tot}$ between the two currents $I_x$ and $I_y$:

$$I_{tot} = \beta V_A \cdot V_{P_{cx}}(t_{ref}) \cdot \cos \phi(t) + \beta V_A \cdot V_{P_{cy}}(t_{ref}) \cdot \sin \phi(t) \tag{10}$$

This result may be reformulated in the following manner:

$$I_{tot} = C_{p_C} \cdot \cos(\alpha_{p_C} - \phi(t)) \tag{11}$$

where $C_{pC}$ and $\alpha_{pC}$ respectively represent the modulus and the phase of the local contrast vector of the pixel $p_C$, since $V_{pCx}(t_{ref})$ and $V_{pCy}(t_{ref})$ respectively represent, apart from a constant of proportionality, the components of the same vector along the x and Y axes.

The result obtained in the adder 22 is preferably then sent to a temporal coding circuit 23 as described in EP 1 150 250. That circuit supplies pulses $I_{mo}$ and $I_{ph}$ respectively representing in temporally coded form the modulus and the phase of the contrast vector.

The multipliers 18a and 18b are preferably as shown in FIG. 8, each comprising six transistors M1 to M6 connected as shown. The circuit has the advantage that the stray respective capacitances M1, M2 and M3, M4 constitute the sampling capacitors $14_R$, $14_L$, $14_A$ and $14_B$ of FIG. 5, which in this case are incorporated directly into the calculation circuit 15.

The embodiment of the invention just described with reference to FIGS. 5 to 8 determines by calculation the norm and the orientation of the contrast vector very accurately, which can be important in certain applications.

However, as already mentioned in the preamble, in other applications it may suffice to determine the value of the maximum component of the contrast (cX, cY) accompanied by approximate angular information as to the orientation of this vector. In that kind of application, each pixel of the sensor may be implemented even more simply than just described with reference to FIGS. 5 to 8, since in this case the pixel may be implemented with a simple logic circuit and with no calculation circuit, which further reduces its complexity and power consumption.

The second embodiment of the sensor exploits in particular the fact that the orientation of the contrast vector can be determined on the basis of the temporal order of the information coming from the pixels adjacent the pixel concerned, in which case the orientation can be coded in binary form.

The second embodiment is described with reference to FIGS. 9 to 14.

FIG. 9 is a simplified diagram of one pixel p of the sensor, here the central pixel $p_C$ visible in FIG. 3, for example. This pixel comprises a photosensor circuit ph identical to that of the pixel represented in FIG. 5. However, in FIG. 9, the output terminal 9 of the amplifier 8 is connected to one of the inputs of a comparator 25 whose other input 26 receives a voltage $V_{WHITE}$ representing the white level. The comparator 25 delivers at its output 27 a signal S representing the time during an image capture cycle at which the signal delivered by the amplifier 8 reaches the white level voltage $V_{WHITE}$ (in this instance this is the signal S from the central pixel, and is therefore designated $S_C$).

The terminal 9 is connected to a semiconductor switch 28 controlled by the output signal of an inverting OR gate 29 with four inputs receiving the signals $S_L$, $S_R$, $S_B$ and $S_A$ from the comparators 25 of the respective pixels adjacent the pixel $p_C$. The switch 28 is also connected to a storage capacitor 30 and to the first input of another comparator 31 whose second input 32 receives a signal representing a threshold voltage $V_{th}(t)$.

The output of the comparator 31 is connected to a pulse sender 33 to which it supplies an identification signal (address) of the pixel concerned. The pulse sender 33 therefore delivers two address signals $I_x$ and $I_y$ that are the coordinates of the pixel concerned and a binary signal, on three bits in this example, representing the orientation of the contrast. The orientation signals $I_{B0}$, $I_{B1}$ and $I_{B2}$ are generated from binary signals B0, B1 and B2 resulting from logical processing described later of the signals $S_B$, $S_A$, $S_L$ and $S_R$.

When the switch 5 is closed by the control signal applied to the terminal 7 (referred herein to as the image capture cycle command signal RST), the voltage across the capacitor 4 is forced to take the value of the voltage $V_{BLACK}$. Then, when the switch 5 is opened again, the photocurrent $I_{ph}$ caused by exposure of the sensor to the observed scene is integrated in the capacitor 4.

The output 27 of the comparator 25 is transmitted to the four adjacent pixels $p_L$, $p_R$, $p_B$ and $p_A$ and changes to the high state when the voltage $V_p(t)$ rises above the white level signal $V_{WHITE}$. The signals $S_L$, $S_R$, $S_B$ and $S_A$ coming from the comparators 25 of the four adjacent pixels are combined in the OR gate 29 so that the switch 28 is turned on for as long as these four signals are low. As soon as one of the four signals goes high, the capacitor 30 stores the voltage $V_p(t)$.

FIG. 10 shows one example of the temporal evolution of the voltage $V_p$ of the pixel concerned and of those $V_L$, $V_R$, $V_B$ and $V_A$ of its four neighbors. In this example, the contrast in the vertical direction ($V_A$, $V_B$) is greater than that in the horizontal direction ($V_L$, $V_R$). The pixel $p_A$ is that for which the photocurrent is the highest. It is therefore the first to reach the white level $V_{WHITE}$. At this moment, the signal $S_A$ at the input of the OR gate 29 of the central pixel $p_C$ goes high with the result that the voltage $V_p$ in this pixel is sampled in the capacitor 30. The difference between the voltage $V_{WHITE}$ and the voltage $V_p$ sampled at the time $t_A$ at which the voltage $V_A$ reaches the white level represents the maximum component of the contrast vector ($C_x$, $C_y$).

The current in the photodiode 1 of the pixel $p_C$ (or of any other pixel of the sensor) is given by the equation:

$$I_{pC} = I_0 R_{pC} \quad (12)$$

in which $I_0$ is proportional to the illumination of the observed scene and $R_{pC}$ is the reflectance of the portion of the scene focused on the pixel $p_C$.

The voltage $V_A$ reaches the white level after a time $t_A$ given by the equation:

$$t_A = \frac{C_{30} V_{WHITE}}{I_A} = \frac{C_{30} V_{WHITE}}{I_0 R_A} \quad (13)$$

in which $C_{30}$ is the value of the capacitor 30 of the pixel $p_C$, $I_A$ is the photocurrent in the pixel $p_A$, and $R_A$ is the reflectance of the portion of the scene focused onto the pixel $p_A$.

The voltage $V_{30}$ stored in the capacitor 30 of the pixel $p_C$ is therefore:

$$V_C = \frac{I_C}{C_{30}} t_H = V_{WHITE} \frac{R_{pc}}{R_H} \quad (14)$$

Thus the voltage $V_C$ is independent of the level of illumination of the sensor.

Accordingly, the second embodiment of the invention generates the maximum component of the contrast vector, rather than the norm of the contrast, by exploiting the temporal evolution of the integrated photocurrents, which avoids any calculation in the pixels.

Figures 11, 12:
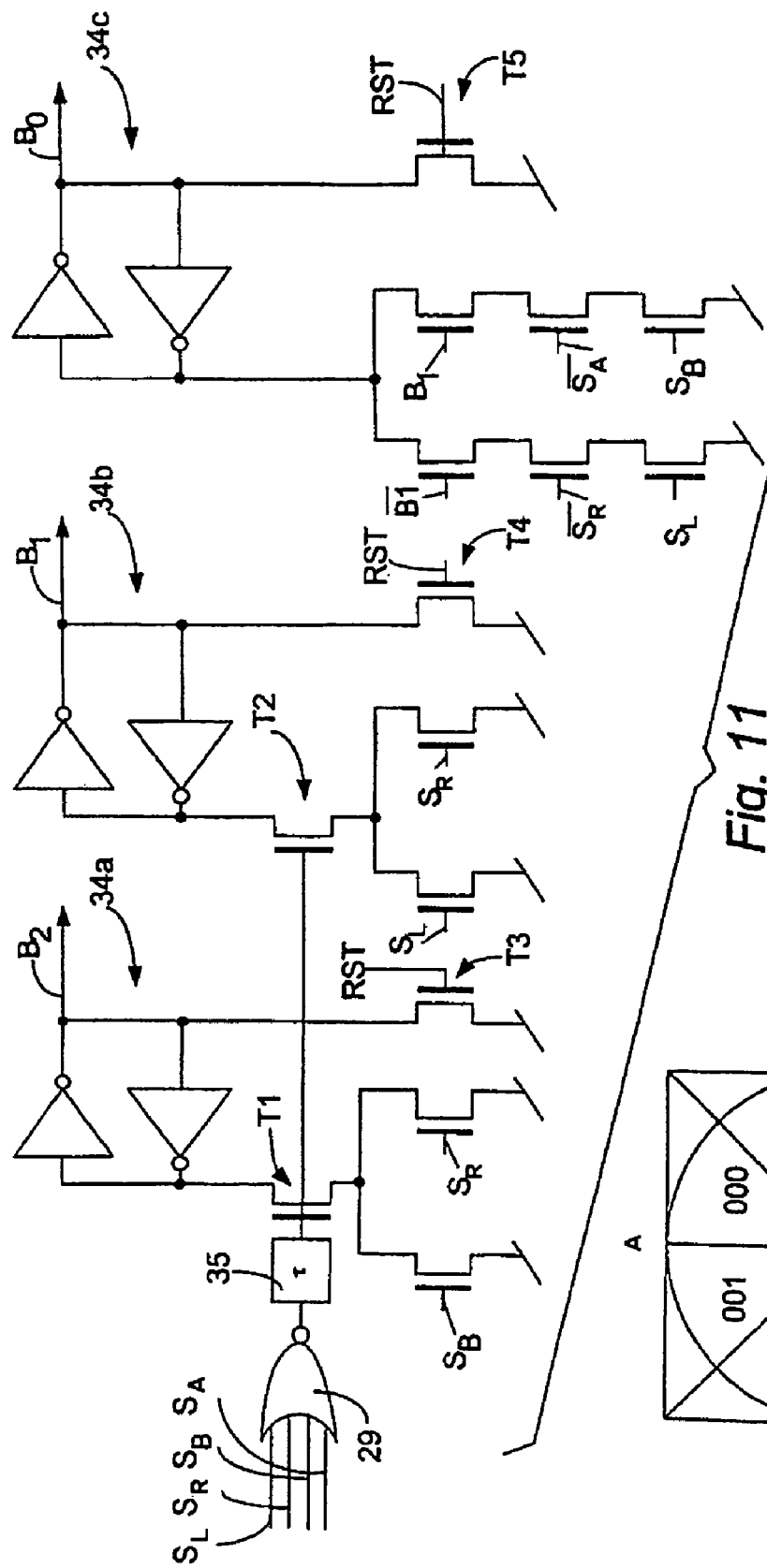
FIG. 11 is a detailed diagram of one of the functional units of the FIG. 9 embodiment.
FIG. 12 is a diagram showing the operation of the FIG. 11 functional unit.

The pixel of the second embodiment of the invention can also provide information concerning the orientation of the contrast. To this end, as shown in FIG. 9, it includes an orientation determination circuit 34 of which FIG. 11 represents a preferred embodiment.

The orientation determination circuit 34 estimates the situation of the orientation of the contrast in eight segments of the trigonometric circle (know as octants), although the invention is not limited to this example. Depending on the required accuracy of the determination of the orientation, the person skilled in the art could modify the circuit 34 to estimate the orientation of the contrast in four segments or in more than eight segments of the trigonometric circle.

The input of the orientation determination circuit 34 is connected to the output of the inverting OR gate 29 whose output is connected to a delay circuit 35 that controls two switching transistors T1 and T2 inserted into two logic sections 34a and 34b, respectively, of the circuit 34.

Each section 34a and 34b generates a bit of the binary signal representing the orientation of the contrast. Because in this example the orientation is determined in octants, this binary signal comprises three bits B0, B1 and B2. The logic sections 34a and 34b respectively determine the values of the two more significant bits B1 and B2 as a function of the output signal of the gate 29 and the signals $S_B$, $S_R$ and $S_L$ in accordance with the following truth table:

|       | B2 | B1 |
|-------|----|----|
| $S_A$ | 0  | 0  |
| $S_L$ | 0  | 1  |
| $S_B$ | 1  | 0  |
| $S_R$ | 1  | 1  |

The circuit 34 also comprises a third logic circuit 34c which generates the least significant bit B0 as a function of the states B1 and B2 and the signals applied to the gate 29.

The three logic sections 34a, 34b and 34c are activated/deactivated by the command signal RST applied to respective control transistors T3, T4 and T5 provided in each section.

If the command signal RST is high, the bits B2, B1 and B0 are set to 0, the signals $S_L$, $S_R$, $S_B$ and $S_A$ are low, and the output of the gate 29 is high. The transistors T1 and T2 are therefore turned on. If one of the four signals $S_L$, $S_R$, $S_B$ and $S_A$ goes high, the bits B1 and B2 change state, if necessary. As soon as one of the inputs of the OR gate 29 is high, its output goes low. As a result of this the transistors T1 and T2 are turned off after a delay introduced by the delay circuit 35, which prevents subsequent modification of the state of the bits B1 and B2.

The state of the bit B0 is determined by whichever of the signals $S_L$, $S_R$, $S_B$ and $S_A$ goes high second during the exposure cycle concerned. For example, if the bit B1 is high, the bit B0 will be set high if the signal SB goes high before the signal $S_A$, indicating that the local orientation of the contrast corresponds to the octant 3 (the octant O3 in FIG. 12), if the bit B2 is low. On the other hand, if the bit B2 is high, it will be the octant 7 (the octant O7 in FIG. 12). If the bit B1 is low, for example, it will be set high if the signal SL goes high before the signal SR during the exposure cycle concerned.

The contrast information stored in the capacitor 30 (FIG. 2) is read utilizing the ramp analog/digital converter principle described in the patent EP 1 150 250. The comparator 31 compares the voltage stored in this capacitor to a reference voltage $V_{TH}(t)$ that increases with time during the exposure cycle. When the reference voltage $V_{TH}(t)$ rises above the voltage on the capacitor, a pulse coding the address of the pixel and the state of the bits B2, B1 and B0 is sent to each of the corresponding outputs Ix, Iy and $I_{B2}$, $I_{B1}$ and $I_{B0}$. The time of appearance of the address pulses therefore codes the value of the contrast and the state of the lines $I_{B2}$, $I_{B1}$, $I_{B0}$ codes the orientation of the contrast.

Figure 13:
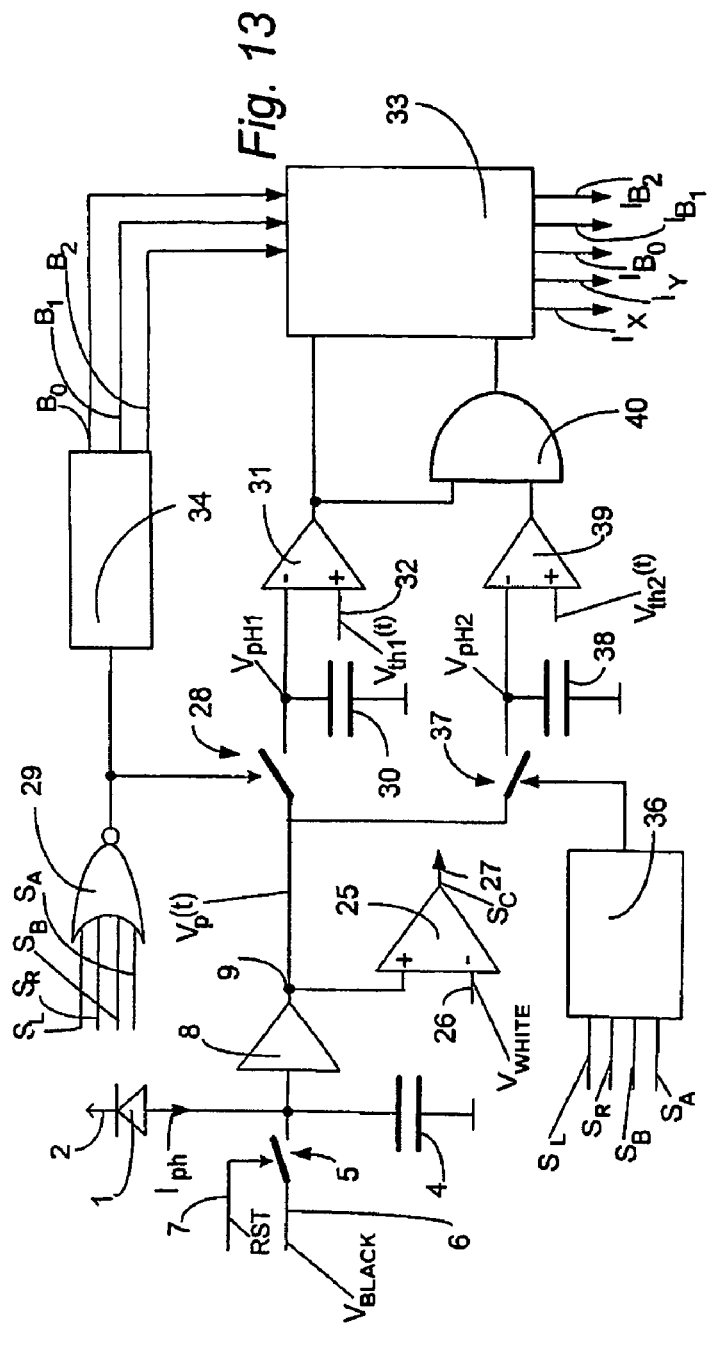
FIG. 13 is a diagram of a variant of the FIG. 9 embodiment.

The variant represented in FIG. 13 refines the measured orientation of the contrast compared to that of the embodiment described with reference to FIGS. 9 to 11. In this case, a logic circuit 36 generates a command signal if two of the signals $S_L$, $S_R$, $S_B$ and $S_A$ are high. This command signal operates on a switch 37 connected between the output 9 of the amplifier 8 and a capacitor 38. The voltage accumulated in the latter is transmitted to an input of a comparator 39 whose other input is at a variable reference voltage $V_{th2}(t)$ different from the reference voltage, here designated $V_{th1}(t)$, applied to the comparator 31. The inputs of an AND gate 40 are connected to respective outputs of the comparators 31 and 39 and its output is connected to the pulse sender 33.

In this variant, the voltage $V_p(t)$ is stored in the capacitor 38 when, during the cycle, a second neighbor of the pixel concerned reaches the white level, emitting its signal $S_L$, $S_R$, $S_B$ or $S_A$. Under these conditions, the voltages stored in the capacitors 30 and 38 represent the two components of the contrast, the state of the bits B2 and B1 distinguishing between the X and Y components.

Taking the FIG. 10 situation by way of example, the capacitor 30 stores the voltage $V_p(t)$ when the signal $S_A$ goes high and the capacitor 38 stores that voltage when the signal $S_R$ goes high. When they have been read, these two voltage values may be combined to refine the measured orientation.

Figure 14:
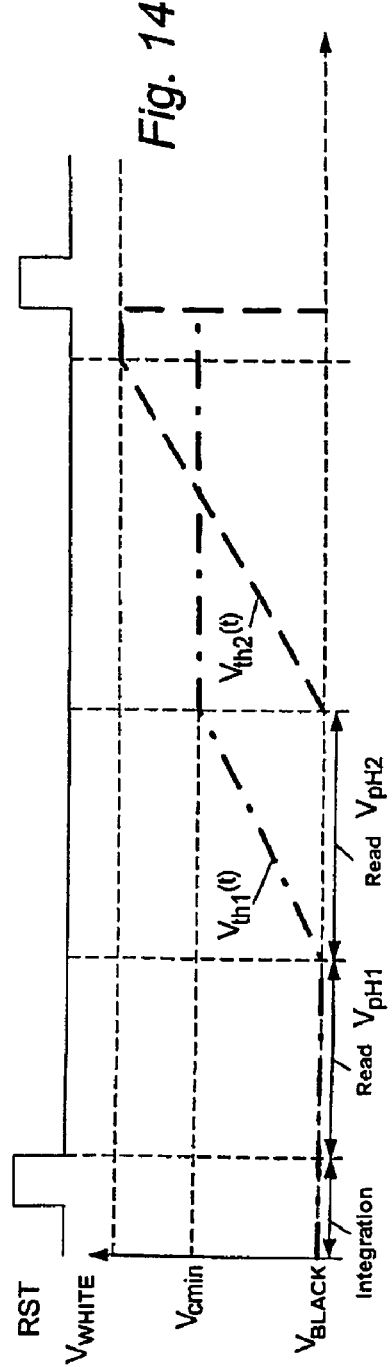
FIG. 14 is a timing diagram showing the operation of the FIG. 13 variant.

They are then read in two stages, as shown in FIG. 14. In a first stage, the ramp voltage $V_{th1}(t)$ reads the voltages stored in the capacitors 30 of the pixels. This ramp starts from the voltage $V_{BLACK}$ and terminates at a voltage $V_{cmin}$ that is either chosen as a function of the application or adjusted in a loop to optimize the quantity of the read information, limiting the transmission of contrast to pixels for which the maximum component of the contrast is greater than $V_{WHITE}-V_{cmin}$. In a second phase, the voltage $V_{th1}(t)$ is maintained at the voltage $V_{cmin}$. At the same time, the voltage $V_{th2}(t)$ changes between $V_{BLACK}$ and $V_{WHITE}$. A pixel sends a measurement pulse when the comparator 39 changes state only if the output of the comparator 31 is high (AND gate 40).

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. Method of determining the local contrast at the level of each pixel ($p_C$) of an array ($M_p$) of photosensitive pixels disposed in at least one dimension (x, y), in which method, during respective successive image capture cycles, a signal ($L_C$) is generated that is representative of the local luminance captured by each pixel, the luminance signals ($L_{pn}$, $L_{p(n+1)}$, $L_{p(n-1)}$) being integrated values of the luminance values captured by respective pixels ($p_C$, $p_L$, $p_R$, $p_A$, $p_B$),
said method consisting in sampling the integrated values of the signals representing the luminances captured by the pixels ($p_L$, $p_R$, $p_A$, $p_B$) adjacent a pixel concerned ($p_C$) at a time in said cycle at which the integrated value of the luminance captured by said pixel concerned ($p_C$) becomes equal to a predetermined reference value ($V_{ref}$, $V_{WHITE}$), and determining the local contrast of said pixel concerned ($p_C$) on the basis of the values sampled in this way.

2. Method according to claim 1, wherein said reference value ($V_{ref}$) is chosen as an intermediate value of the difference between a maximum white level value (NB) and a maximum black level value (NN) liable to be captured by said pixels ($p_C$, $p_L$, $p_R$, $p_A$, $p_B$).

3. Method according to claim 2, further comprising calculating the local contrast by applying to said at least one dimension of said array the following expression:

$$C_{pn} = \frac{L_{p(n-1)} - L_{p(n+1)}}{L_{pn}}$$

in which
$C_{pn}$ is the local contrast calculated for said cycle of a pixel of rank n ($p_c$) in the row of the array oriented along said dimension,
$L_{pn}$ is a signal representing the luminance captured by the pixel of rank n ($p_c$),
$L_{p(n-1)}$ is a signal representing the luminance captured by the preceding adjacent pixel in said row of rank n−1 ($p_L$), and
$L_{p(n+1)}$ is a signal representing the luminance captured by the next adjacent pixel in said row of rank n+1 ($p_R$).

4. Method according to claim 2, wherein the integrated values of the signals representing the luminances captured by said adjacent pixels ($p_L$, $p_R$, $p_A$, $p_B$) are accumulated in respective capacitors ($14_R$, $14_L$, $14_A$, $14_B$) at the time at which the integrated value of the pixel concerned ($p_C$) reaches said reference value ($V_{ref}$), said capacitors providing the values necessary for the calculation of the contrast.

5. Method according to claim 4, wherein each pair of accumulated values ($V_L(t_{ref})$, $V_R(t_{ref})$ and $V_A(t_{ref})$, $V_B(t_{ref})$) belonging to said x and y directions, respectively, is subjected to four-quadrant analog multiplication by a cosinusoidal signal and a sinusoidal signal of the same frequency and amplitude as said cosinusoidal signal, respectively, and the results ($I_x$, $I_y$) of the corresponding multiplications are added to form the modulus and the phase of the local contrast vector corresponding to said pixel concerned ($p_C$).

6. Method according to claim 2, wherein, if said array takes the form of a matrix ($M_p$) of pixels with two dimensions, the contrast calculation is effected on the basis of the following equations:

$$C_x = L_L - L_R$$

and $$C_y = L_A - L_B$$

in which:

$C_x$ is the local contrast component in the x direction of the matrix, $C_y$ is the local contrast component in the y direction of the matrix, $L_L$, $L_R$ are signals representative of the luminances captured by the respective pixels ($p_L$, $p_R$) adjacent the pixel concerned ($p_C$) in the x direction, $L_A$, $L_B$ are signals representative of the luminances captured by the respective pixels ($p_A$, $p_B$) adjacent the pixel concerned ($p_C$) in the y direction, said expressions being used to calculate the components of the contrast vector at the level of said pixel concerned ($p_C$).

7. Method according to claim 2, wherein said intermediate value is equal to half said difference.

8. Method according to claim 1, wherein said reference value is chosen to be a maximum white level value ($V_{WHITE}$) liable to be captured by said pixels ($p_C$, $p_L$, $p_R$, $p_A$, $p_B$).

9. Method according to claim 8, further comprising, during each of said image capture cycles, measuring the times at which, in a group of pixels made up of the pixel concerned and its adjacent pixels ($p_C$, $p_L$, $p_R$, $p_A$, $p_B$), the integrated values of the luminance values captured by those pixels reach said white level value ($V_{WHITE}$) and taking as the value of the local contrast the integrated value for the pixel concerned when the first of the adjacent pixels ($p_R$, $p_L$, $p_A$, $p_B$) reaches said white level value.

10. Method according to claim 9, further comprising generating pulse signals ($S_L$, $S_R$, $S_B$, $S_A$) coding each of said times and effecting a logical combination of said pulse signals ($S_L$, $S_R$, $S_B$, $S_A$) to determine the orientation of said local contrast as a function of the order in which the integrated values of the pixels of said groups of pixels ($p_C$, $p_L$, $p_R$, $p_A$, $p_B$) reach said white level value ($V_{WHITE}$).

11. Method according to claim 10, wherein the order of said times is coded on three bits ($B_0$, $B_1$, $B_2$) and the orientation of said contrast value is determined in octants of the trigonometrical circle.

12. Method according to claim 9, further comprising taking as a second component of the contrast the integrated value for the pixel concerned when the second of said integrated values for the adjacent pixels ($p_R$, $p_L$, $p_A$, $p_B$) reaches said white level.

13. Sensor for determining the local contrast of an observed scene by detecting the luminance emanating from that scene using an array having at least one row of pixels disposed in at least one dimension of said array, said sensor comprising in each pixel ($p_C$) a photosensitive circuit (ph) supplying a signal representing the local luminance ($V_{ci}$) emanating from the image and captured by said pixel in the form of an integration value ($V_p(t)$), a comparator (10) for comparing said signal representing the local luminance to a reference value ($V_{ref}$, $V_{WHITE}$) and supplying a command signal when said luminance signal is equal to said reference value, and a source delivering a reference value ($V_{ref}$) that is equal to an intermediate value of the difference between a maximum white level value (NB) and a maximum black level value (NN) liable to be captured by said pixels.

14. Sensor according to claim 13, further comprising a local contrast calculation circuit and means for applying to said calculation circuit, in response to said command signal, the signals representing the local luminance of the pixels ($p_L$, $p_R$, $p_A$, $p_B$) immediately adjacent the pixels concerned ($p_C$).

15. Sensor according to claim 14, wherein said signals representing the local luminance ($V_P(t)$, $V_L(t)$, $V_R(t)$, $V_A(t)$, $V_B(t)$) take the form of voltages.

16. Sensor according to claim 15, wherein said means for applying to said calculation circuit said signals representing the local luminance comprise a set of capacitors for storing the voltages ($V_L(t)$, $V_R(t)$, $V_A(t)$, $V_B(t)$) supplied by said immediately adjacent pixels while said integrated value of said pixel concerned evolves towards the reference value ($V_{ref}$).

17. Sensor according to claim 16 further comprising for each of said directions (x, y) analog four-quadrant multiplier means connected to multiply the respective voltages stored in said capacitors with sinusoidal voltages, an adder being provided for summing the result of the multiplications effected by said multiplier means in order to deduce therefrom the local contrast vector of said pixel concerned.

18. Sensor according to claim 17, wherein said analog multiplier means comprise for each of said directions (x, y) a multiplier implemented by means of transistors (M1 to M6), the stray capacitances of the transistors (M1 to M4) provided at the inputs of said multipliers forming said respective storage capacitors.

19. Sensor according to claim 13, further comprising a source delivering said reference value ($V_{WHITE}$) that is equal to a maximum white level value liable to be captured by said pixels ($p_C$, $p_L$, $p_R$, $p_A$, $p_B$).

20. Sensor according to claim 19, further comprising in each pixel ($p_C$) means for delivering a binary signal ($S_L$, $S_R$, $S_B$, $S_A$) when, during each of said cycles, said integrated value reaches said white value ($V_{WHITE}$), OR logic means connected to receive from said adjacent pixels ($p_L$, $p_R$, $p_A$, $p_B$) the binary signal ($S_L$, $S_R$, $S_B$, $S_A$) delivered thereby, where applicable, and logical combination means for assigning an orientation value to the contrast value captured by the pixel concerned as a function of the binary state of each of said binary signals ($S_L$, $S_R$, $S_B$, $S_A$).

21. Sensor according to claim 20, further comprising a second capacitor in which is stored the integrated voltage of the pixel concerned when the second of said binary signals ($S_L$, $S_R$, $S_B$, $S_A$) goes high.

22. Sensor according to claim 19, wherein, when the first of the signals ($S_L$, $S_R$, $S_B$, $S_A$) goes high, the integrated value for the pixel concerned is stored in a capacitor.

* * * * *